(12) United States Patent
Cesarano et al.

(10) Patent No.: US 9,821,857 B2
(45) Date of Patent: Nov. 21, 2017

(54) MOTOR-VEHICLE FLOOR PANEL STRUCTURE

(71) Applicant: FCA Italy S.p.A., Turin (IT)

(72) Inventors: Antonio Cesarano, Candiolo (IT); Bogdan Stoenescu, Turin (IT); Gianfranco Del Nero, Orbassano (IT)

(73) Assignee: FCA ITALY S.P.A., Turin (IT)

(*) Notice: Subject to any disclaimer, the term of this patent is extended or adjusted under 35 U.S.C. 154(b) by 0 days.

(21) Appl. No.: 15/087,358

(22) Filed: Mar. 31, 2016

(65) Prior Publication Data

US 2016/0355213 A1 Dec. 8, 2016

(30) Foreign Application Priority Data

Jun. 4, 2015 (IT) .................. 102015000020541

(51) Int. Cl.
*B62D 25/20* (2006.01)
*B62D 25/08* (2006.01)
*B62D 43/10* (2006.01)

(52) U.S. Cl.
CPC ......... *B62D 25/2009* (2013.01); *B62D 25/08* (2013.01); *B62D 25/20* (2013.01);
(Continued)

(58) Field of Classification Search
CPC .... B62D 25/08; B62D 25/20; B62D 25/2009; B62D 25/2018; B62D 25/2027
(Continued)

(56) References Cited

U.S. PATENT DOCUMENTS 8,585,134 B2* 11/2013 Yasui .................. B62D 21/152
296/204
8,714,634 B2* 5/2014 Mori ..................... B62D 21/10
296/193.07
(Continued)

FOREIGN PATENT DOCUMENTS

DE 102010051783 A1 7/2011
EP 2815953 A1 12/2014
(Continued)

OTHER PUBLICATIONS

English translation of JP 2015-171825; retreived on Apr. 27, 2016 via the Japan Platform for Patent Information located at https://www.j-platpat.inpit.go.jp/web/all/top/BTmTopEnglishPage.*
(Continued)

*Primary Examiner* — Jason S Daniels
(74) *Attorney, Agent, or Firm* — Heslin Rothenberg Farley & Mesiti P.C.; Victor A. Cardona, Esq.

(57) ABSTRACT

A motor-vehicle floor panel structure comprises a front body sub-unit, a central floor sub-unit, and a rear body sub-unit. The central floor sub-unit comprises a front floor structure including a central longitudinal tunnel, a pair of lateral longitudinal beams, connected to the front floor structure and to the front body sub-unit and two intermediate longitudinal beams which connect the central floor sub-unit to the front body sub-unit and which extend at intermediate areas between the lateral longitudinal beams and the central tunnel. The intermediate longitudinal beams are connected to the upper surface of the front floor structure and have portions which extend in a cantilever fashion from the front edge of the front floor structure and which are connected to said front body sub-unit. Due to this feature the floor structure has a lower surface which is substantially close to a regular continuous surface, so as to reduce turbulences in the air flowing under the floor panel structure during travel of the motor-vehicle, with a resulting positive impact on fuel consumption.

12 Claims, 11 Drawing Sheets

(52) U.S. Cl.
CPC ..... *B62D 25/2018* (2013.01); *B62D 25/2027* (2013.01); *B62D 43/10* (2013.01)

(58) Field of Classification Search
USPC ............ 296/187.08, 193.04, 193.07, 193.08, 296/193.09
See application file for complete search history.

(56) References Cited

U.S. PATENT DOCUMENTS

| | | | | |
|---|---|---|---|---|
| 8,979,173 | B2 * | 3/2015 | Kojo | B62D 21/15 296/187.08 |
| 2014/0001790 | A1 | 1/2014 | Zischke et al. | |
| 2014/0306485 | A1 * | 10/2014 | Bechtler | B62D 25/20 296/187.08 |
| 2015/0145284 | A1 | 5/2015 | Nishida et al. | |

FOREIGN PATENT DOCUMENTS

| | | | | |
|---|---|---|---|---|
| JP | 2015171825 | A * | 10/2015 | ............. B60R 19/24 |
| WO | 2008/156000 | A1 | 12/2008 | |

OTHER PUBLICATIONS

Search Report from corresponding Italian Application No. 102015000020541 (it ub20151088) dated Feb. 9, 2016.

* cited by examiner

"PRIOR ART"

FIG. 2B

"PRIOR ART"

MOTOR-VEHICLE FLOOR PANEL STRUCTURE

CROSS REFERENCE TO RELATED APPLICATIONS

This application claims priority of Italian application No. 102015000020541 filed on Jun. 4, 2015, the entire disclosure of which is incorporated herein by reference.

FIELD OF THE INVENTION

The present invention relates to motor-vehicle floor panel structures of the type comprising a front body sub-unit, a central floor sub-unit and a rear body sub-unit, in which the central floor sub-unit comprises a front floor structure including a central longitudinal tunnel, a pair of lateral longitudinal beams connected to the front floor structure and two intermediate longitudinal beams which connect the central floor sub-unit to the front body sub-unit and which extend at intermediate areas between said lateral longitudinal beams and said central tunnel.

Floor panel structures of the above indicated type have a relatively complicated construction and further have the drawback of defining a strongly irregular lower surface of the floor panel, which gives rise to high turbulence in the air flowing under the floor panel during travel of the vehicle, with a resulting increase of the aerodynamic drag of the vehicle and a negative impact on fuel consumption.

OBJECT OF THE INVENTION

The object of the present invention is that of overcoming the above indicated drawbacks.

A further object of the invention is that of achieving this purpose with a floor panel structure which is of a relatively simple and inexpensive construction.

Also a further object of the invention is that of providing a floor panel structure which enables the space available in the luggage compartment of the motor-vehicle to be enlarged.

SUMMARY OF THE INVENTION

In view of achieving the above indicated objects, the floor panel structure according to the invention is characterized primarily in that said intermediate longitudinal beams are connected to the upper surface of the front floor structure and have portions which extend in a cantilever fashion from a front edge of the front floor structure and which are connected to said front body sub-unit.

Due to this feature, said intermediate longitudinal beams do not give rise to any irregularities in the floor panel lower surface, which thus can have a shape very close to a theoretical regular and continuous surface.

In one preferred embodiment, the front body sub-unit and the central floor sub-unit are connected to each other also by two further auxiliary longitudinal beams which are secured to the lower surface of the front floor structure and which have a cross-section having a height substantially lower than one half of their width, so as to reduce their projection with respect to the lower surface of the floor panel to a minimum.

According to a further feature, in the afore-said preferred embodiment, between the central tunnel and the two lateral longitudinal beams there extend two cross-member portions which are arranged above said intermediate longitudinal beams projecting from the upper surface of the front floor structure.

Due to all the above indicated features, the floor panel structure according to the invention defines a floor panel lower surface which is substantially close to a theoretical regular and continuous surface.

Also in order to improve this result, the floor panel structure according to the invention is preferably further characterized in that said rear body sub-unit includes a portion defining a space for containing a spare-wheel and having a recessed bottom wall defining a surface lying in a theoretical plane substantially tangent to a longitudinally central portion of said floor panel structure.

Due to this feature, also the rear portion of the floor panel structure has a lower surface close to said theoretical continuous surface and the aerodynamic drag of the motor vehicle is thus further reduced, while obtaining an increase in height of the space available in the luggage compartment, above and below said space for containing the spare-wheel.

DESCRIPTION OF A PREFERRED EMBODIMENT

Further features and advantages of the invention will become apparent from the following description with reference to the annexed drawings, given purely by way of non-limiting example, in which.

Figure 1:
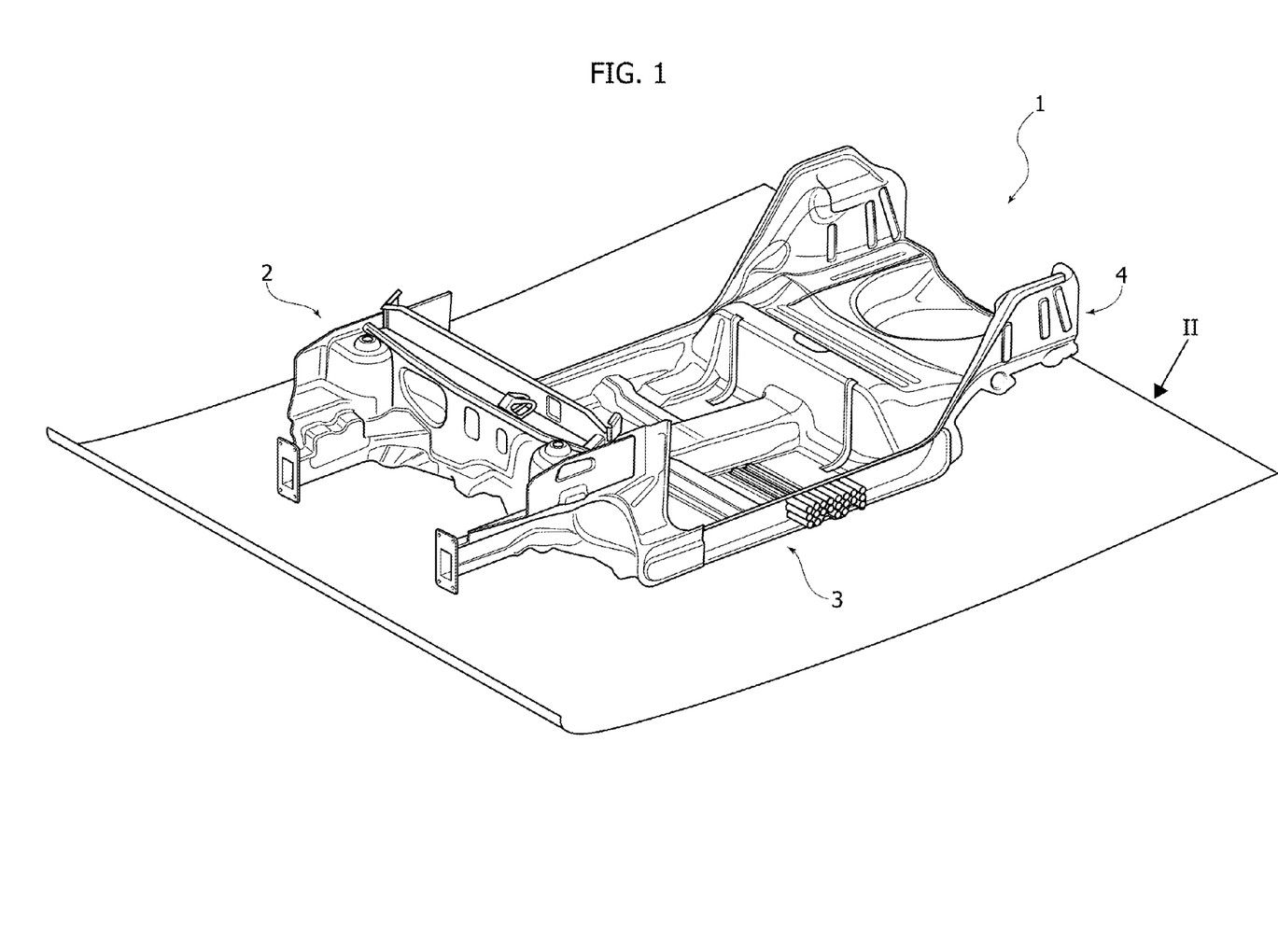
FIG. 1 is a perspective view of a preferred embodiment of a motor-vehicle floor panel structure according to the invention.
Figure 2A:
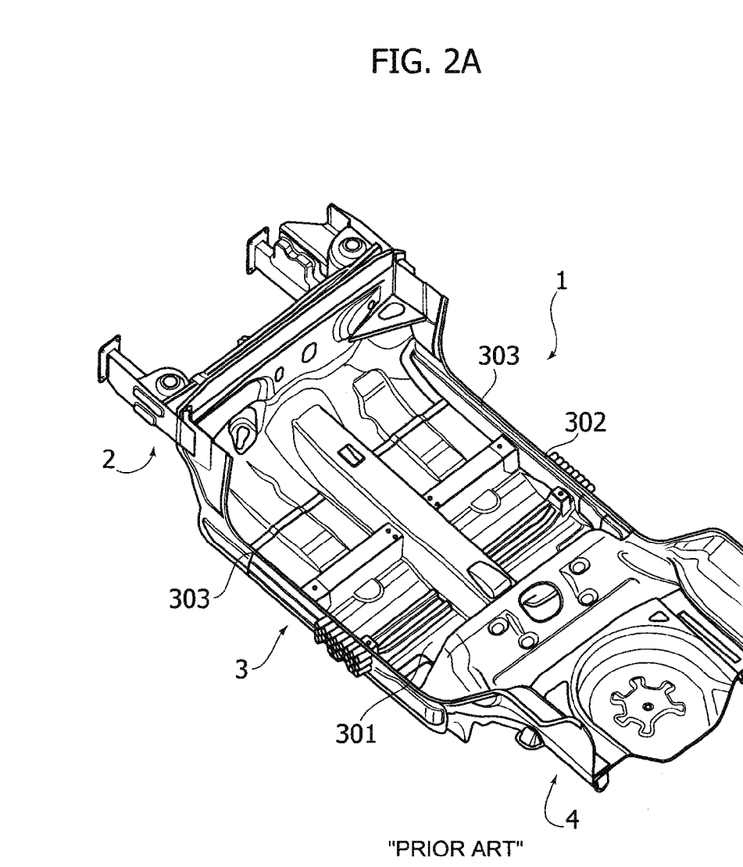
FIGS. 2A, 2B are perspective views from above of a floor panel structure according to the prior art (FIG. 2A) and of a floor panel structure according to the preferred embodiment of the invention (FIG. 2B)
Figure 2B:
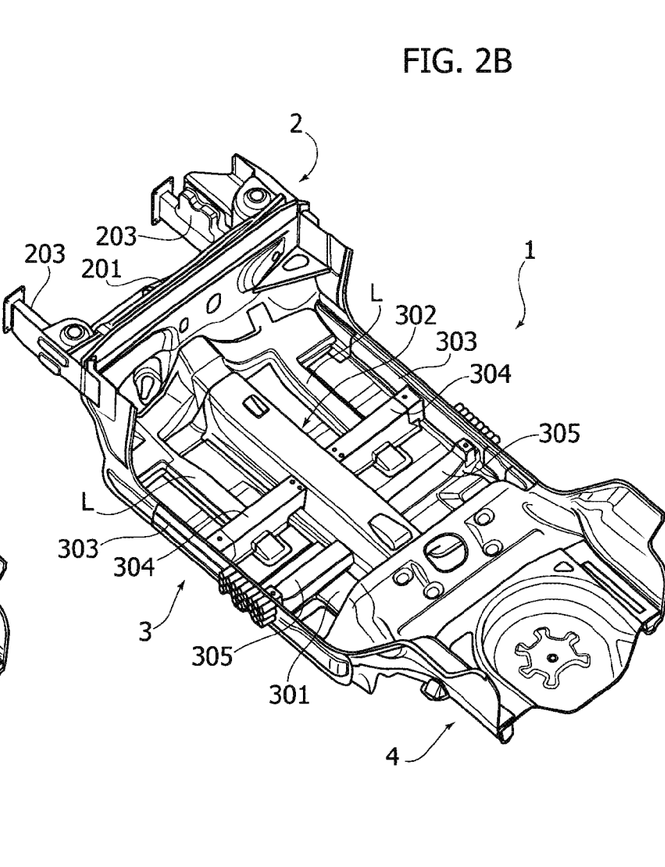
Figures 3A, 3B:
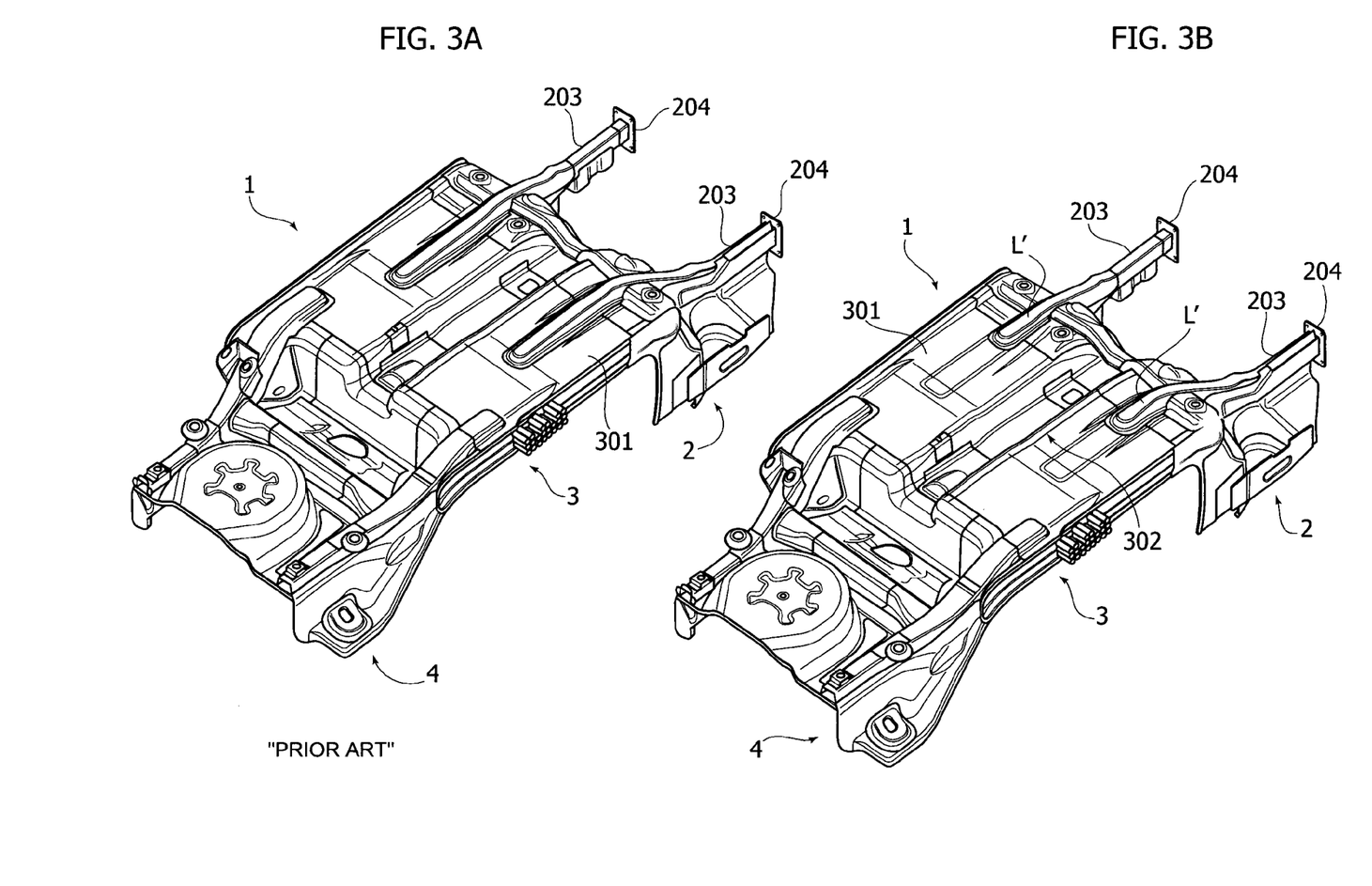
FIGS. 3A, 3B show perspective views from above of the known floor panel structure and the preferred embodiment of the invention, respectively.

FIG. 1 is a perspective view of a preferred embodiment of a floor panel structure 1 according to the invention, constituted by sheet metal elements forming three main sub-units: a front body sub-unit 2, a central floor sub-unit 3 and a rear body sub-unit 4.

The floor panel structure according to the invention is made in such a way as to obtain a lower surface of the floor panel structure which is substantially close to a theoretical regular and continuous surface, designated by Π in FIG. 1. In this manner, turbulences in the air flowing below the floor panel structure during movement of the motor-vehicle are reduced to a minimum, with a resulting reduction of the aerodynamic drag of the entire motor-vehicle and an improvement of the travel stability at high speeds.

As already indicated in the foregoing, in FIGS. 2-11, figures labeled by a letter "A" refer to a known floor panel structure, whereas figures labeled by a letter "B" refer to a preferred embodiment of the floor panel structure according to the invention.

Figure 5A:
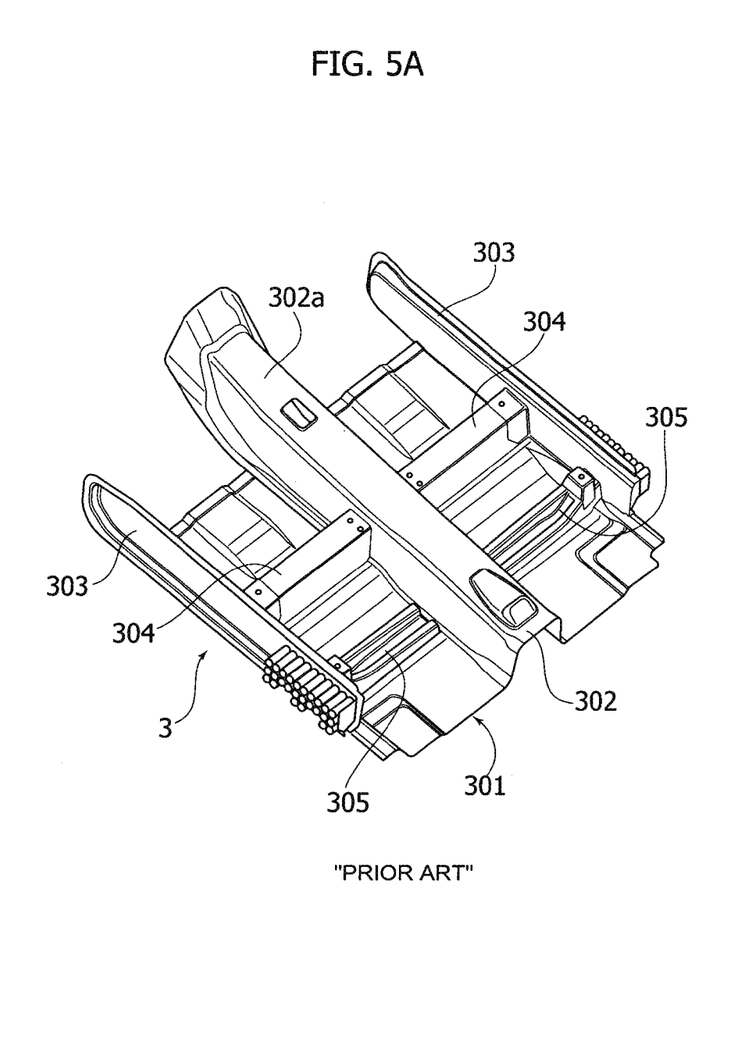
Figure 5B:
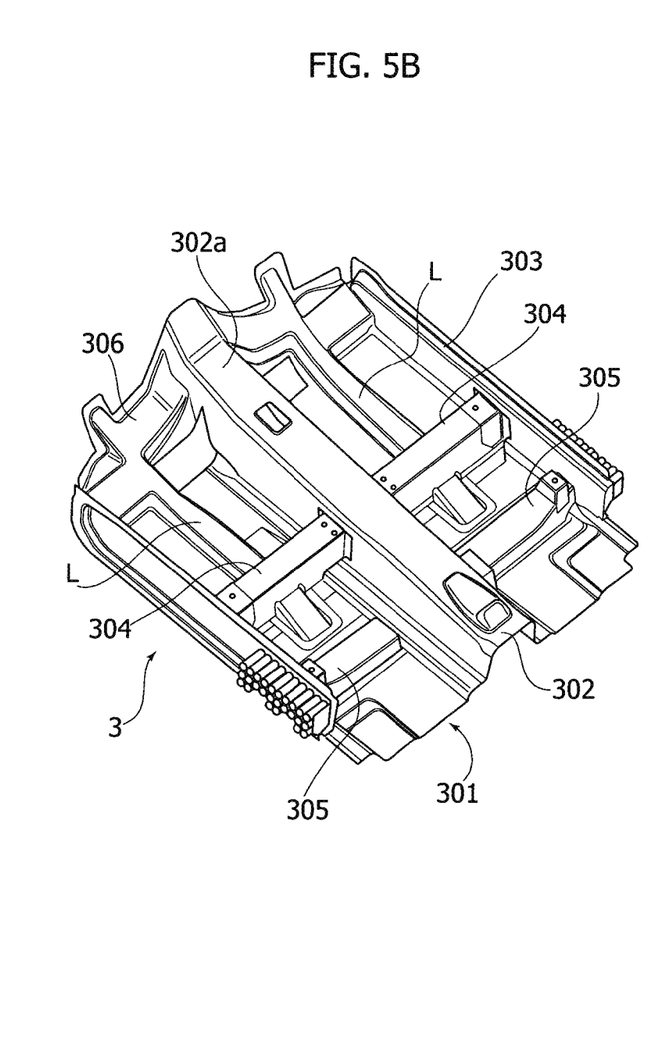

With reference in particular to FIGS. 5A, 5B, the known floor panel structure and the floor structure of the invention both have a central floor sub-unit 3 comprising a front floor structure 301 (so-called front half-floor) made by sheet metal elements welded to each other and including a central longitudinal tunnel 302. Both in the known structure and in the structure of the invention, the two lateral longitudinal edges of the front floor structure 301 are rigidly connected, by welding, to two lateral longitudinal beams 303. Furthermore, in both cases the central longitudinal tunnel 302 has a front extension constituted by a sheet metal element 302*a* connected to the front edge of panel 301. Both in the known solution and in the case of the structure according to the invention, moreover, between the central tunnel 302 and the lateral longitudinal beams 303 there extend two seat-supporting front cross-member portions 304 and two seat-supporting central cross-member portions 305 made by sheet metal elements shaped with a cross-section substantially in form of an omega.

Figure 4A:
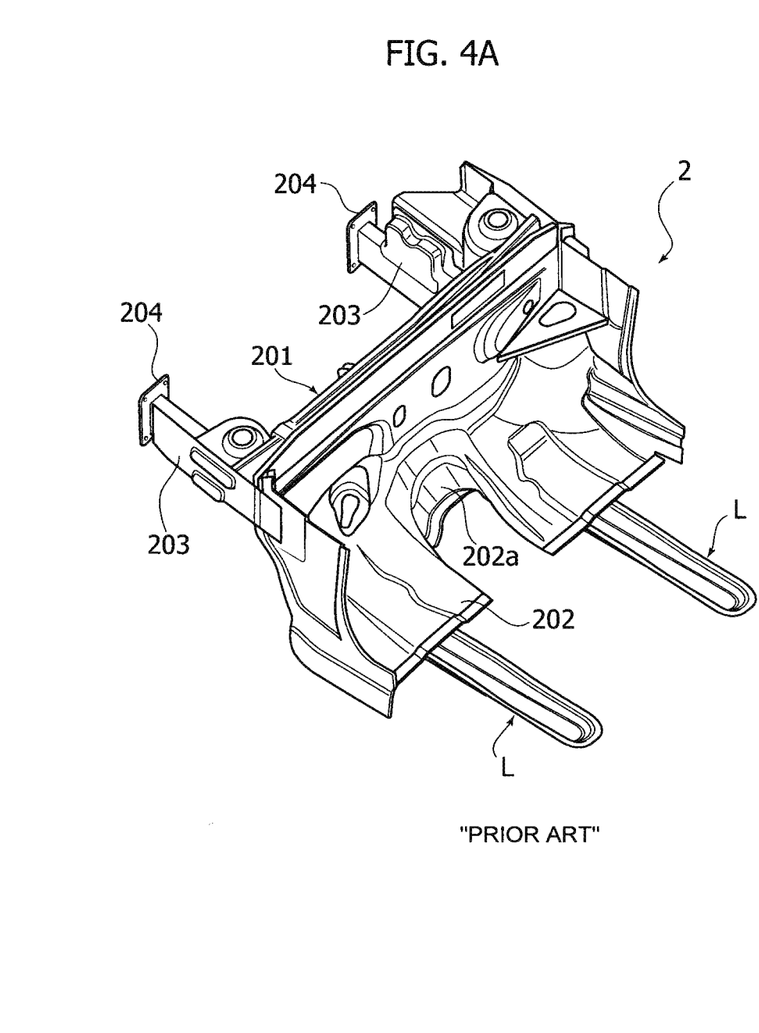
FIGS. 4A, 4B, 5A, 5B, 6A, 6B, 7A, 7B show details of the known floor panel structure (figures labeled with a letter "A") and details of the floor panel structure according to the preferred embodiment of the invention (figures labeled with a letter "B")
Figure 4B:
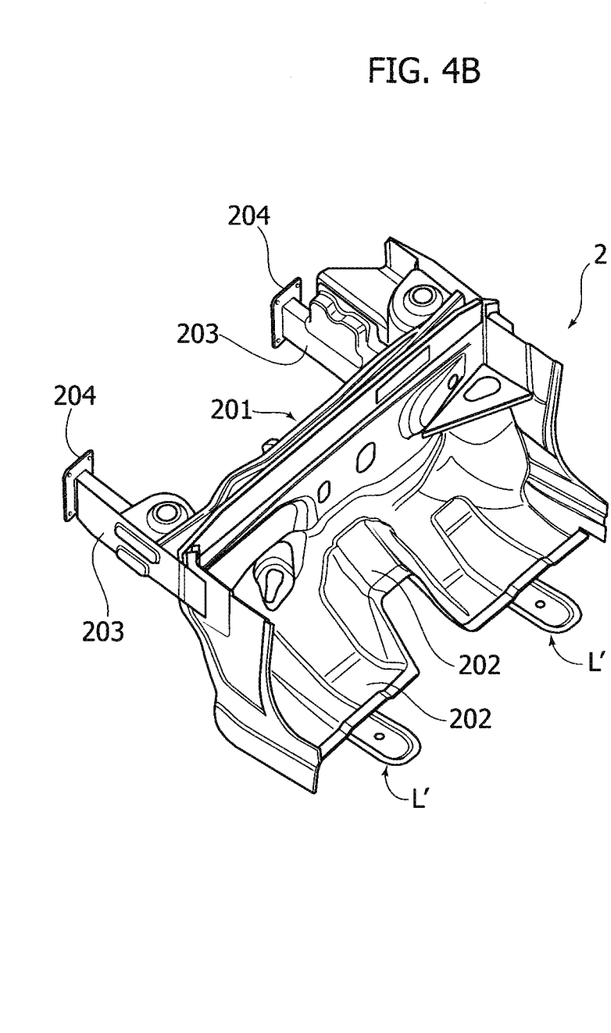
Figure 8:
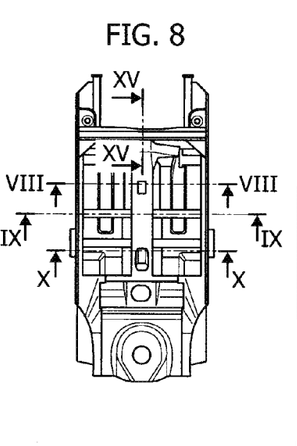
FIG. 8 is a plan view of a generic floor panel structure.
Figure 8A:
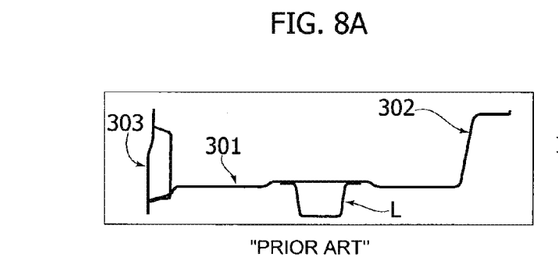
FIGS. 8A, 8B, 9A, 9B and 10A, 10B show cross-sectional views according to lines VIII, IX and X of FIG. 7, respectively in the case of the known floor panel structure (figures labeled with a letter "A") and in the case of the floor panel structure according to the preferred embodiment of the invention (figures labeled with a letter "B"), respectively.
Figure 8B:
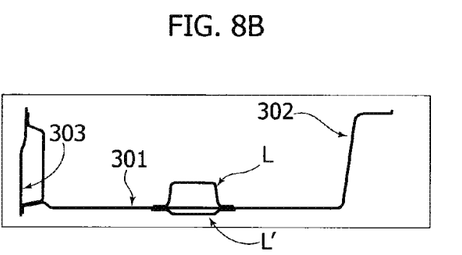
Figure 9A:
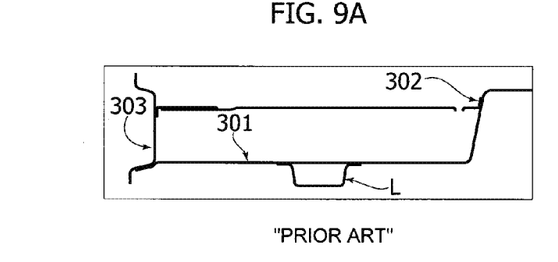
Figure 9B:
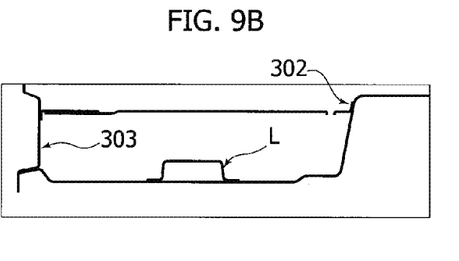
Figure 10A:
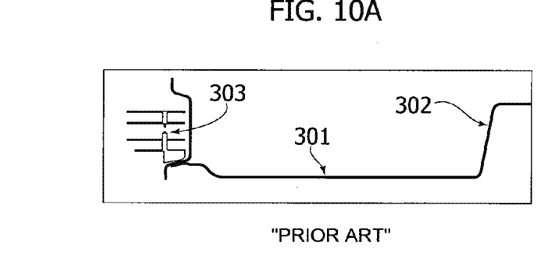
Figure 10B:
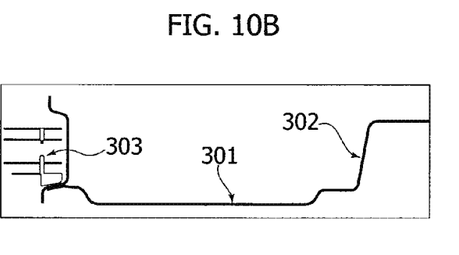

With reference now to FIGS. 4A, 4B in connection with FIGS. 5A, 5B, both in the known floor structure and in the floor structure according to the invention there are provided intermediate longitudinal beams L which extend at intermediate areas between the central tunnel 302 and the lateral longitudinal beams 303. However, a first important difference of the invention with respect to the known solution lies in that in the case of the known solution the intermediate longitudinal beams L (see FIG. 4A) are secured to the lower surface of the front floor structure 301 (see FIG. 5A), whereas in the case of the invention the intermediate longitudinal beams L are secured to the upper surface of the front floor structure (see FIG. 5B). Both in the known solution and in the case of the preferred embodiment of the invention, said intermediate longitudinal beams L are defined by elements of sheet metal shaped with a cross-section in form of an omega, having a relatively relevant height with respect to their width, for example a height at least of 0.3-0.5 times their width (see also FIGS. 8A, 9A compared with FIGS. 8B, 9B). Therefore, the arrangement of the intermediate longitudinal beams L on the upper surface of the front floor structure, rather than on the lower surface the latter, totally eliminates an important source of turbulences which take place, in the known solution, in the air flowing below the floor panel structure during travel of the motor-vehicle.

Also with reference to FIG. 5B, in the case of the preferred embodiment of the invention, the intermediate longitudinal beams L have portions of greater length welded to the upper surface of the floor structure 301 and portions of lower length projecting in a cantilever fashion from the front edge of panel 301 and connected to each other by a further cross-member structure 306 having a central tunnel portion 302*a* and arranged spaced apart from the front edge of the floor structure.

Also according to the preferred embodiment which is illustrated herein, at the same location of the two intermediate longitudinal beams L, but on the opposite side of the floor panel 301, there are arranged two further auxiliary longitudinal beams L', which project in a cantilever fashion from the front body sub-unit 2 (see FIG. 4B). The two auxiliary longitudinal beams L' also have a substantially omega-shaped cross-section, but have a height much lower than their width (see also FIG. 8B), and at least lower than one half of their width, so that they do not affect negatively the aerodynamic features of the lower surface of the floor panel structure.

Also with reference to FIGS. 4A, 4B, the front body sub-unit comprises, both in the known solution and in the embodiment of the invention, a transverse wall 201. At the rear side of wall 201, with reference to the direction of travel of the motor-vehicle, there is connected a firewall 202 defining the front terminal portion of the floor of the motor-vehicle passenger compartment, whose rear edge is bent horizontally, for being connected to the central floor sub-unit 3. Wall 202 has a central tunnel portion 202*a* which constitutes a front terminal part of the central tunnel of the floor panel structure. From the front side of the transverse wall 201 there project two struts 203 whose front ends carry two plates 204 which are to be connected to respective crash-box structures (not shown) forming part of a front cross-member of the motor-vehicle body.

In the case of the known solution, the front body sub-unit 2 and the central floor sub-unit 3 are connected to each other by the longitudinal lateral beams 303, the tunnel portions 202*a*, 302*a*, and the intermediate longitudinal beams L connected to the lower surface of the front floor structure 301. In the case of the preferred embodiment of the invention, the front body sub-unit 2 and the central floor sub-unit 3 are secured to each other by the lateral longitudinal beams 303, the central tunnel portions 302*a*, 202*a*, the intermediate longitudinal beams L connected to the upper surface of the front floor structure 301 and also by the auxiliary longitudinal beams L' connected to the lower surface of the panel 301.

In the case of the preferred embodiment of the invention, the cross-member portions 304 extend above the intermediate longitudinal beams L and for this reason they have lateral walls having notches adapted to engage the intermediate longitudinal beams L from above.

With reference now to FIGS. 6A, 6B, 7A, 7B, 11A, 11B, 12-14, both in the known solution, and in the preferred embodiment of the invention, the rear body sub-unit 4 comprises a spare-wheel cup portion 401 defining a space for containing a spare-wheel, having a bottom wall 402 at a lower level with respect to a peripheral portion 403. At the two sides of the rear sub-unit 4 two vertical walls 404 are provided which define spaces for the rear wheels of the motor-vehicle. The side walls 404 and the lateral edges of the spare-wheel cup portion 401 are connected at opposite sides to two rear longitudinal beams P which are connected to each other by a cross-member structure 405 constituting a floor rear portion.

Figure 6A:
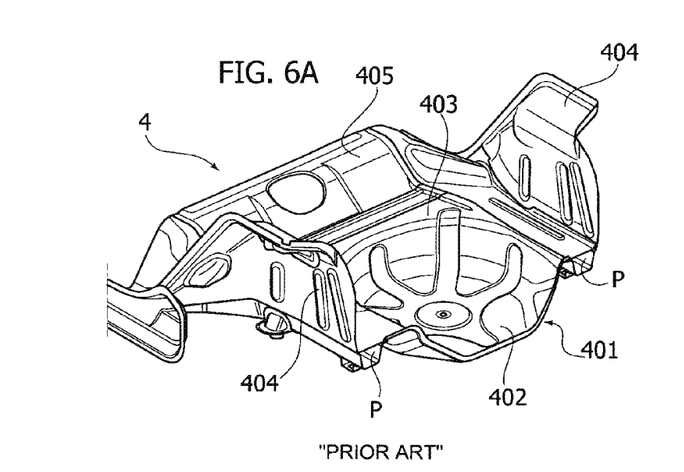
Figure 6B:
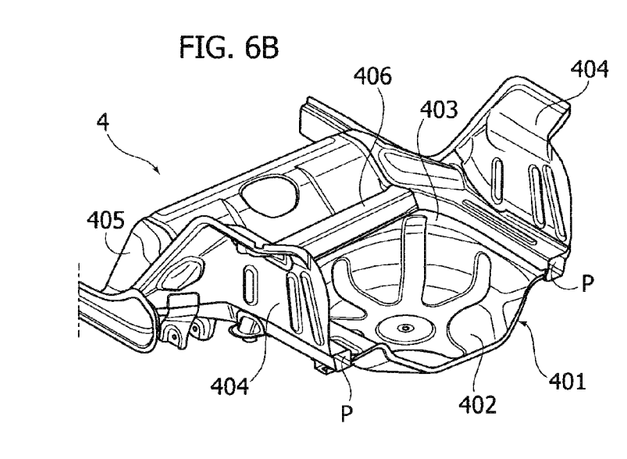
Figure 7A:
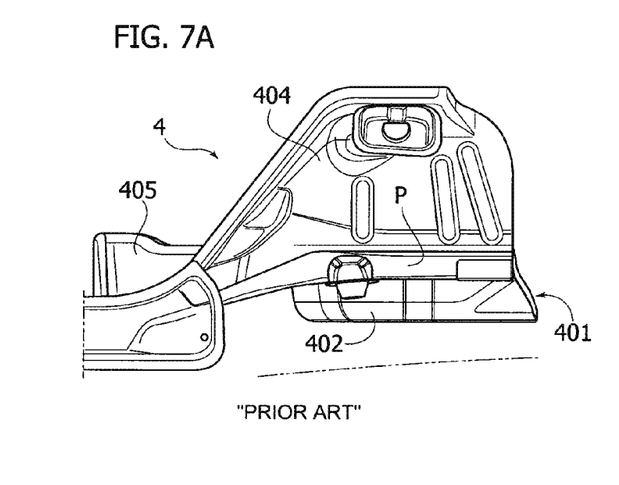
Figure 7B:
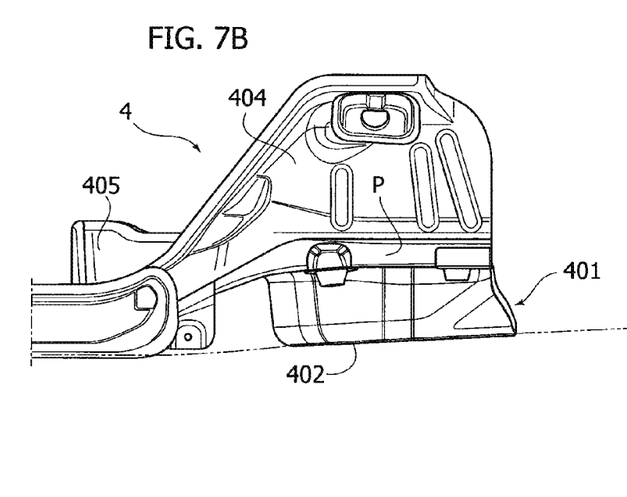

As visible for example from the comparison between FIGS. 6A, 6B, the difference in height between the peripheral portion 403 of the central panel 401 and the bottom wall 402 is substantially identical.

Figure 11A:
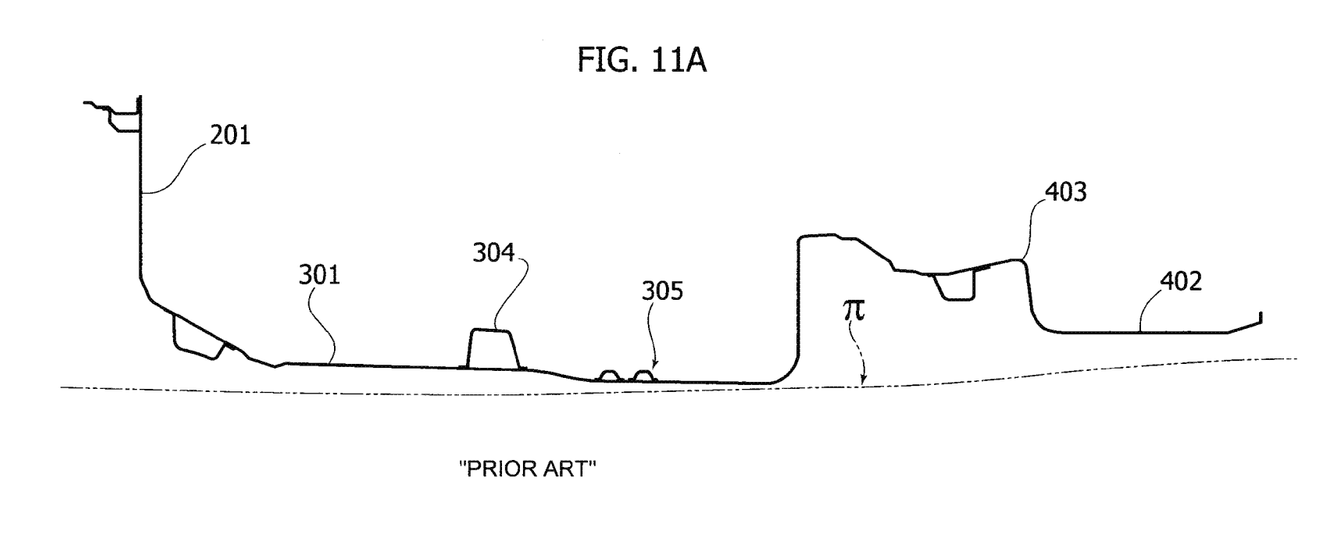
FIGS. 11A, 11B show the profile in longitudinal cross-section of the known floor panel structure and the floor panel structure according to the preferred embodiment of the invention.
Figure 11B:
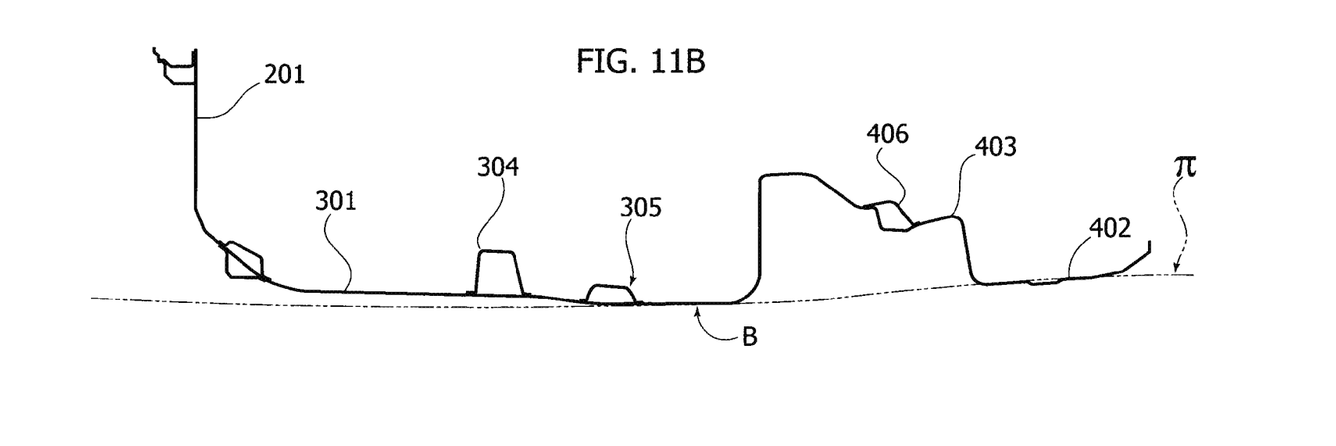

However, in the case of the solution of the invention (FIG. 6B) the peripheral portion 403 of the central panel 401 is at a lowered level with respect to the upper surfaces of the two rear longitudinal beams P, so that between the floor 405 and the peripheral portion 403 of the central panel 401 there is defined a step portion 406. Due to this arrangement, the bottom wall 402 of the space for containing the spare-wheel is arranged at a much lower level with respect to the case of the known solution, as visible also in the comparison between FIGS. 11A and 11B. With reference in particular to FIG. 11B, the bottom wall 402 lies in a theoretical plane Π which is substantially tangent to the portion designated by B in FIG. 11B of the floor panel structure which is located at a central position with respect to the longitudinal extension of the floor structure. The comparison of FIGS. 11A, 11B shows that, compared to the known solution, in the solution according to the present invention the lower surface of the floor structure is much closer to a theoretical regular and continuous surface Π so as to greatly reduce the turbulence of the air flowing under the floor panel structure during travel of the motor-vehicle.

Figure 12:
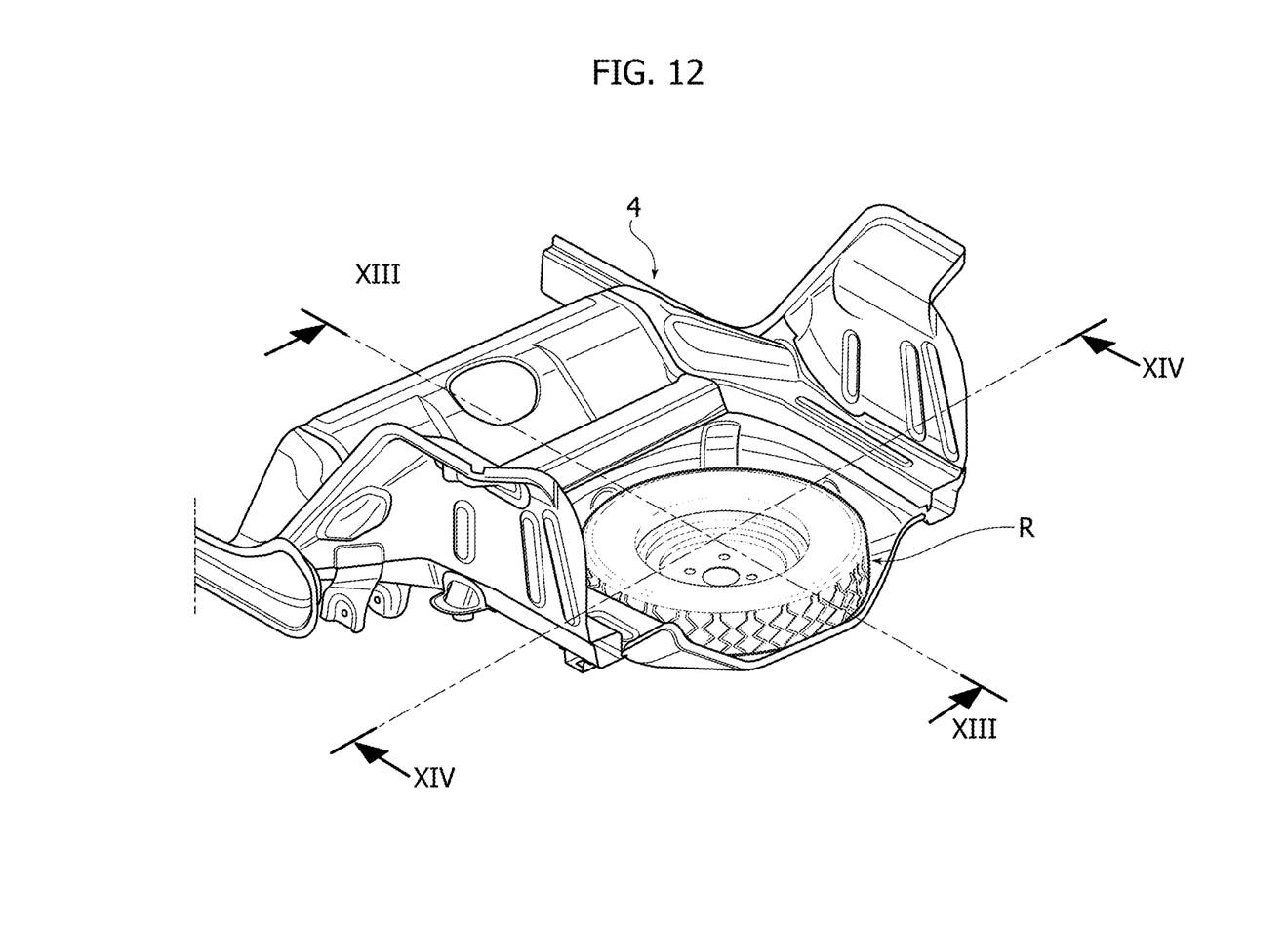
FIG. 12 is a perspective view of the rear body sub-unit forming part of the floor panel structure according to the invention, with a spare-wheel mounted therein, FIGS. 13, 14 diagrammatically show cross-sectional views according to lines XIII and XIV of FIG. 12, and FIGS. 15A, 15B diagrammatically show cross-sectional views taken along line XV of FIG. 8, respectively in the case of the known floor panel structure and in the case of the floor panel structure according to the preferred embodiment of the invention.
Figure 13:
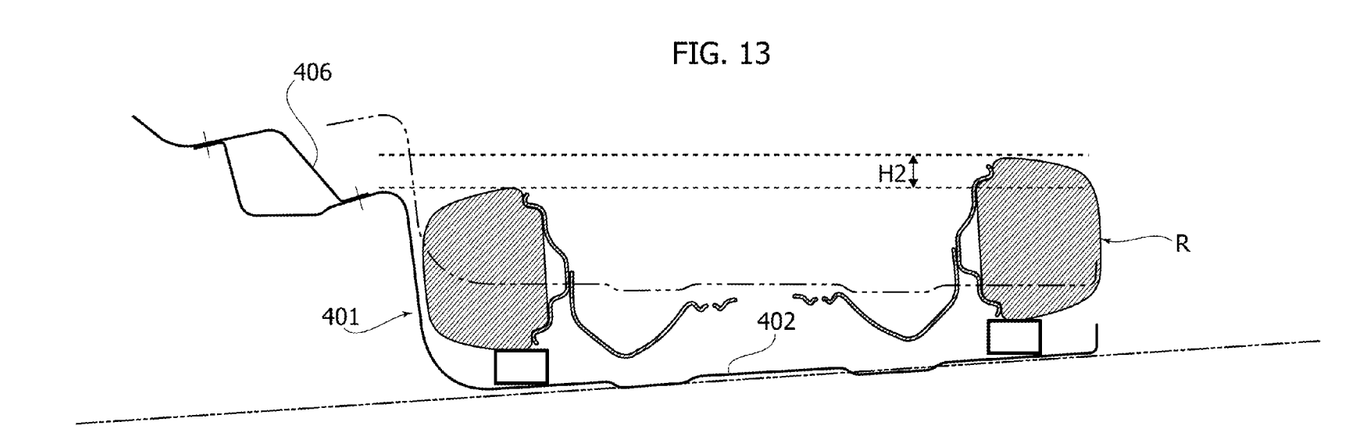
Figure 14:
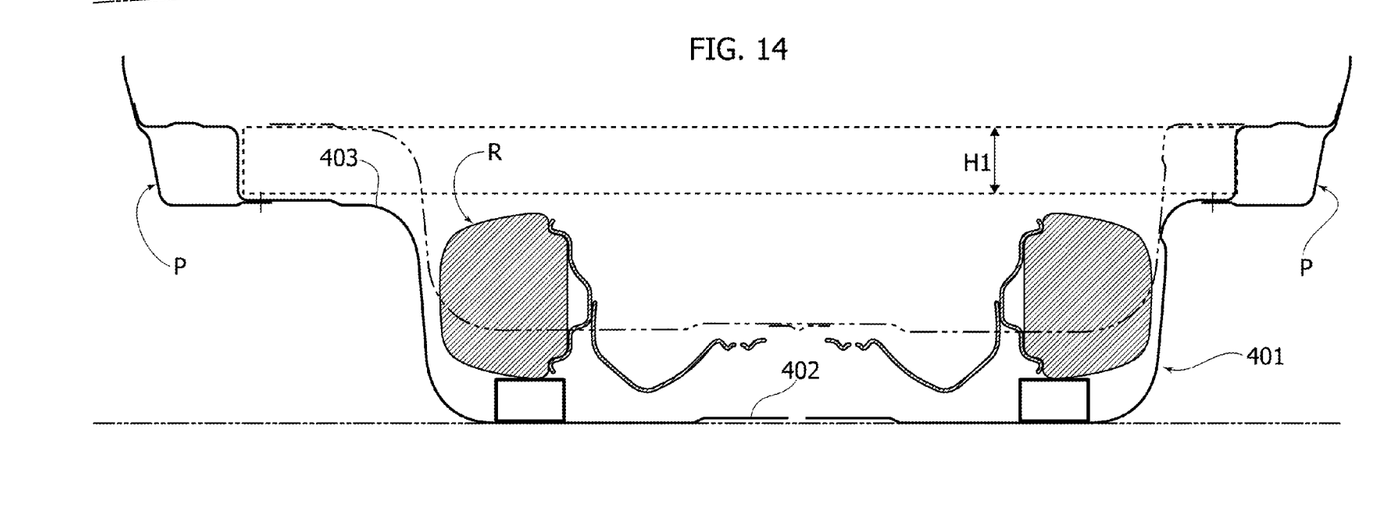

FIGS. 12-14 show a spare wheel R received within the space defined by the cup portion 401 with the bottom wall 402. The provision of the peripheral portion 403 at a lowered level with respect to the upper surfaces of the two rear longitudinal beams P enable the additional space corresponding to vertical dimensions H1, H2 as indicated in FIGS. 13, 14 to be provided in the luggage compartment, above the space for containing the spare-wheel R.

Figure 15A:
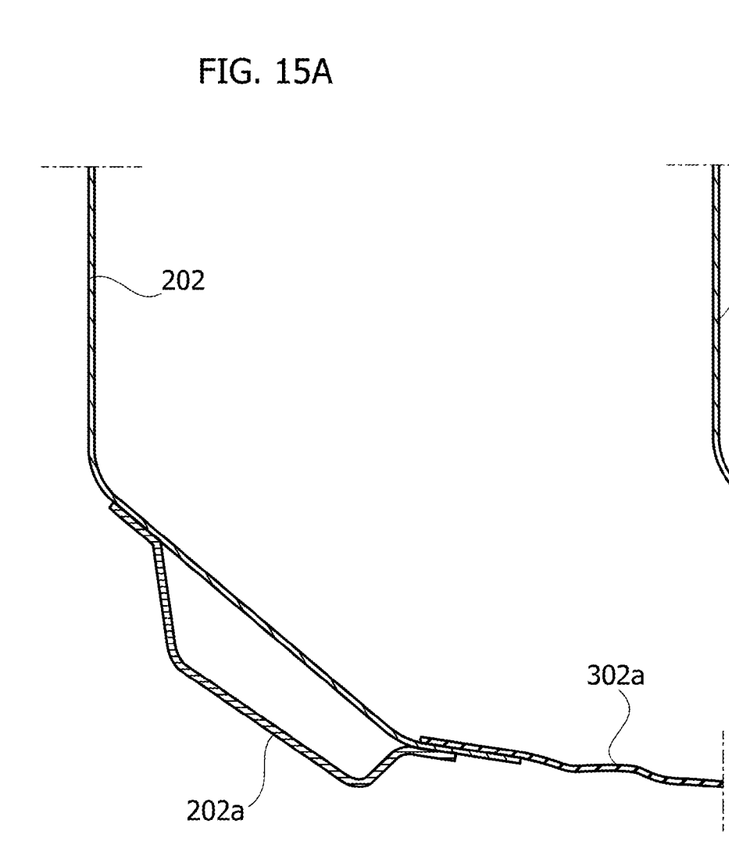
Figure 15B:
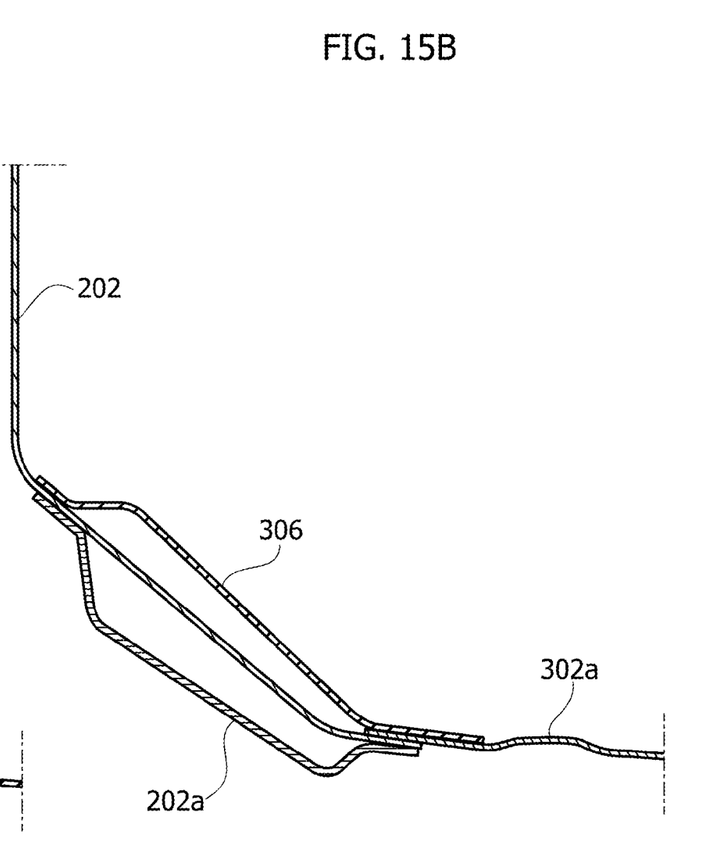

As clearly apparent from the comparison of FIGS. 15A, 15B, in the case of the invention at the overlapping area of metal sheets 202, 302 there is added a third element 306 which is used for maintaining an adequate general cross-section, notwithstanding the reduction of the distance between elements 202 and 202*a*.

As clearly apparent from the foregoing description, the floor panel structure according to the invention achieves the goal of a significant reduction of the aerodynamic resistance of the motor-vehicle, without involving a complicated construction and without affecting the strength and reliability of the vehicle structure.

Naturally, while the principle of the invention remains the same, the details of construction and the embodiments may widely vary with respect to what has been described purely by way of example, without departing from the scope of the present invention.

What is claimed is:

1. A motor-vehicle floor panel structure, comprising:
a front body sub-unit,
a central floor sub-unit, and
a rear body sub-unit,
in which the central floor sub-unit comprises:
a front floor structure including a central longitudinal tunnel,
a pair of lateral longitudinal beams, connected to the front floor structure and to the front body sub-unit,
two intermediate longitudinal beams which connect the central floor sub-unit to the front body sub-unit and which extend at intermediate areas between said lateral longitudinal beams and said central tunnel,
said intermediate longitudinal beams connected to an upper surface of the front floor structure and have extending portions which extend in a cantilever fashion from a front edge of the front floor structure such that the extending portions are unconnected to said upper surface of the front floor structure and which are connected to said front body sub-unit, each of said intermediate longitudinal beams having a lower surface located on said upper surface of the front floor structure such that said intermediate longitudinal beams avoid extending below the upper surface to inhibit air turbulence under the vehicle;
said extending portions connected to each other by a cross-member structure longitudinally spaced apart from the front edge of the said front floor structure.

2. A floor structure according to claim 1, further comprising auxiliary intermediate longitudinal beams connected to a lower surface of the front floor structure and having a height of less than 0.5 times their width.

3. A floor structure according to claim 2, further comprising cross-member portions which extend between the central tunnel and the lateral longitudinal beams and which are engaged above said intermediate longitudinal beams.

4. A floor structure according to claim 2, wherein the portions of said intermediate longitudinal beams which project in a cantilever fashion from the front edge of the front floor structure are connected to each other by a cross-member structure longitudinally spaced apart from the front edge of the said front floor structure.

5. A floor structure according to claim 2, wherein said rear body sub-unit comprises a main panel with a recessed bottom wall defining a space for housing a spare-wheel, and that said bottom wall defines a substantially flat surface lying in a theoretical plane which is substantially tangent to a portion of said floor structure which is located substantially centrally along the longitudinal extension of said floor structure.

6. A floor structure according to claim 1, wherein the cross-member structure comprises two cross-member portions, each of the cross-member portions extending between the central tunnel and a lateral longitudinal beam of the lateral longitudinal beams and each of the cross-member portions engaged above an intermediate longitudinal beam of said intermediate longitudinal beams.

7. A floor structure according to claim 6, wherein the portions of said intermediate longitudinal beams which project in a cantilever fashion from the front edge of the front floor structure are connected to each other by a cross-member structure longitudinally spaced apart from the front edge of the said front floor structure.

8. A floor structure according to claim 6, wherein said rear body sub-unit comprises a main panel with a recessed bottom wall defining a space for housing a spare-wheel, and that said bottom wall defines a substantially flat surface lying in a theoretical plane which is substantially tangent to a portion of said floor structure which is located substantially centrally along the longitudinal extension of said floor structure.

9. A floor structure according to claim 1, wherein the cross-member structure extends inwardly from each extending structure of said extending structures toward said tunnel.

10. A floor structure according to claim 9, wherein said rear body sub-unit comprises a main panel with a recessed bottom wall defining a space for housing a spare-wheel, and that said bottom wall defines a substantially flat surface lying in a theoretical plane which is substantially tangent to a portion of said floor structure which is located substantially centrally along the longitudinal extension of said floor structure.

11. A floor structure according to claim 1, wherein said rear body sub-unit comprises a main panel with a recessed bottom wall defining a space for housing a spare-wheel, and that said bottom wall defines a substantially flat surface lying in a theoretical plane which is substantially tangent to a portion of said floor structure which is located substantially centrally along the longitudinal extension of said floor structure.

12. A floor structure according to claim 11, wherein said main panel has a peripheral portion surrounding said recessed bottom wall and having two opposite side portions connected to lower surfaces of two rear longitudinal beams forming part of said rear body sub-unit.

\* \* \* \* \*